Sept. 2, 1958  K. C. BOTTENBERG  2,850,360
APPARATUS FOR PRODUCTION OF PRODUCTS BY
EXOTHERMIC-ENDOTHERMIC HEAT EXCHANGE
Filed May 23, 1956
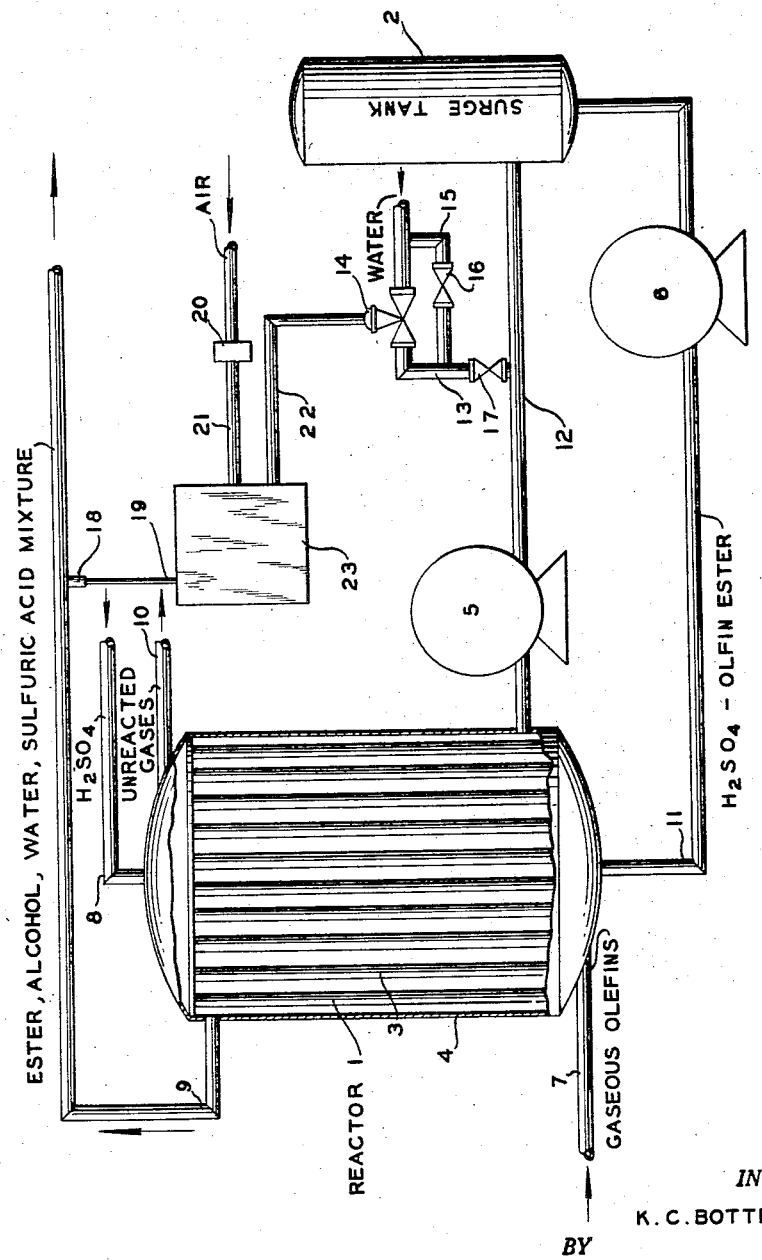
INVENTOR.
K. C. BOTTENBERG
BY
ATTORNEYS United States Patent Office 2,850,360
Patented Sept. 2, 1958

2,850,360

APPARATUS FOR PRODUCTION OF PRODUCTS BY EXOTHERMIC-ENDOTHERMIC HEAT EXCHANGE

Kenneth C. Bottenberg, Bartlesville, Okla., assignor to Phillips Petroleum Company, a corporation of Delaware Application May 23, 1956, Serial No. 586,730

4 Claims. (Cl. 23—252)

This invention relates to the production of products in the production of which there are involved a heat release and a heat intake. A product produced can be one which requires at least one exothermic reaction and at least one endothermic reaction in its production. Also, two different final products can be produced in the apparatus, one of the products being produced by way of an exothermic reaction and the other by way of an endothermic reaction.

In one of its aspects the invention relates to an apparatus for effecting at least one of an exothermic and an endothermic reaction in a controlled manner, the apparatus comprising means for containing an exothermically reacting substance, or substances, adjacent means in immediate but indirect heat transfer relation with said first means for containing an endothermically reacting substance, or substances, and means for varying the relative quantity of at least one of said exothermically and endothermically reacting substances with respect to the other thereby providing means for removing to the extent desired exothermic heat from the exothermically reacting mass and absorbing said heat into the endothermically reacting mass. In another of its aspects the invention relates to an apparatus, suitable for the production of an alcohol, by way of an olefin-acid esterification and a hydrolysis of the ester produced, in which there is provided in combination an indirect heat exchange means, preferably of the tube-bundle and shell type, one side of which is adapted to contain olefin and acid which therein are exothermically reacting to produce an ester, the other side of which is adapted to contain said ester, under conditions of hydrolysis; temperature sensing means upon said heat exchanger for sensing a temperature of at least one side thereof; and means for controlling the relative total amounts of reactants in both sides of said heat exchanger responsive to said temperature. In a further aspect of the invention, means are provided with which additional reactant or diluent can be added to one side of the heat exchanger responsive to the temperature sensed by said temperature sensing means.

This application is at least in part a continuation of Serial No. 272,141, filed by me February 18, 1952, now Patent No. 2,779,803.

The importance of the present invention will be realized when it is considered that the addition of olefin to sulfuric acid may lead to several different products, namely polymers, acid soluble oils and carbonaceous and tarry materials of undetermined constitution and also the presently desired product olefin-sulfuric ester. Excessive temperature during the addition reaction promotes the side reactions leading to undesirable products. Therefore, it is of fundamental or essential importance to provide large quantities of heat removing medium, ordinarily, by refrigeration in large quantities, during the absorption step.

Although one skilled in the art in possession of this disclosure will readily understand that the apparatus of the present invention possesses a fairly wide range of applicability, it will be described in connection with the production of an alcohol by way of an olefin and an acid. Another reaction to which the apparatus of the invention can be applied is production of benzoyl carbinol from benzoyl chloride and diazomethane with the intermediate exothermic formation of diazoacetophenone and HCl. The HCl is neutralized and in the second step hydrolysis yields the carbinol and nitrogen. The diazomethane is dissolved in dioxane before use.

Several processes for the manufacture of alcohols from olefinic hydrocarbons are known. For example: olefins may be absorbed in mineral acids such as sulfuric, phosphoric and hydrofluoric acid to form the inorganic acid addition products with the olefin. The resulting addition products are then hydrolyzed to form the corresponding alcohol and dilute acid. The alcohol is recovered from the dilute acid by steam distillation, fractionation and/or extraction. This invention provides an apparatus which is readily adaptable to the production of various alcohols according to the available olefin, for example, ethanol from ethylene, propanol from propylene and butanols from the various butylenes.

Another means for manufacturing alcohols from olefins involves the direct hydration of olefins at high pressures and relatively high temperatures by contacting the olefins with a solid catalyst in the presence of steam or dilute (approximately 2 to 20 percent) sulfuric acid.

The heat evolved in the absorption step presents a major refrigeration expense if the process is to be operated at a practical rate and with practical size apparatus. The direct hydration of olefins has been utilized as a means for eliminating the problem of refrigeration. However, the direct hydration of olefins involves the use of higher temperatures with resultant losses from side reaction and higher pressures with entailed heavier equipment.

It is an object of the present invention to provide an apparatus in which at least two reactions involving heat release and heat intake can be conducted simultaneously under conditions controlling at least one of said reactions. It is another object of the present invention to provide automatically operating apparatus for the production of alcohols by way of an esterification and a hydrolysis reaction. It is a further object to provide means in said apparatus for varying the relative amounts or masses of each set of reactants to accomplish a temperature control. It is a still further object of this invention to provide a means for the control of reactor temperature during the absorption of olefin in sulfuric acid. Other aspects, objects as well as the several advantages of the invention are apparent from this disclosure, the drawing and the appended claims.

Thus, according to the invention, the apparatus comprises in combination a tube-bundle and shell type heat exchanger; an inlet pipe for acid at one end of said exchanger in open communication with the tubes therein; a gas outlet at said end of said exchanger in open communication with the tubes thereof; an outlet at said end of said exchanger in open communicaiton with the shell space surrounding the tubes thereof; an inlet at the other end of said exchanger in open communication with said tubes; an outlet at said other end of said exchanger in open communication with said tubes; an inlet at said other end of said exchanger in open communication with the shell space surrounding said tubes; a temperature sensing device operatively connected to said shell space; at least one fluid circulating means in fluid communication with said outlet at said other end of said exchanger and said inlet at said other end of said exchanger and in open communication with said shell space; a controlled fluid introducing means in open communication with said fluid circulating means; said temperature sensing means operatively connected to said shell space being also operatively connected with said controlled fluid introducing means.

In another form of the invention the apparatus comprises, in combination, a substantially vertically disposed tube-bundle and shell type heat exchanger; an inlet pipe for acid at the top of said exchanger in open communication with the tubes therein; a gas outlet at the top of said exchanger in open communication with the tubes thereof; an outlet at the top of said exchanger in open communication with the shell space surrounding the tubes thereof to remove partially hydrolyzed ester, water and acid therefrom; an inlet at the bottom of said exchanger in open communication with said tubes for introducing thereinto olefins to be absorbed in acid; an outlet at the bottom of said exchanger in open communication with said tubes for removing olefin-acid therefrom; an inlet at the bottom of said exchanger in open communication with the shell space surrounding said tubes for introducing olefin-acid thereinto for hydrolysis; a temperature sensing device operatively connected to said outlet for removing partially hydrolyzed ester, etc., from said exchanger; a surge tank operatively connected with pump-equipped pipes to maintain circulation of olefin-acid and water to, through and from said shell; a water inlet pipe communicating through a throttle valve with the pipe connecting said tank and said shell for conveying fluid from said tank to said shell; a motor valve on said water inlet pipe; said temperature sensing device being operatively connected to said motor valve; and a by-pass pipe around said motor valve.

It will be understood that while countercurrent flow in the heat exchanger has been described coflow is within the scope of the present invention, which is primarily in the combination of elements employed rather than in the specific design or operation of said elements. It is within the scope of the present invention to provide for a fully automatic operation by providing suitable control mechanism, within the skill of the art, to the olefin and acid inlets.

The reactions involved in the esterification of an olefin with acid are well known and can be represented as follows

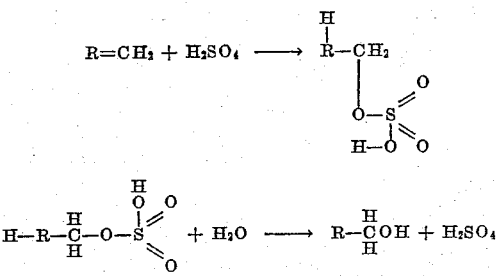

The first of these reactions is exothermic while the second is endothermic. The heat evolved in the first reaction while large is only approximately one-sixth that required for the second reaction, therefore, the second reaction mixture can be utilized to provide an efficient coolant for the first reaction.

The following description of a process utilizing the apparatus of this invention for the production of ethanol from ethylene shows one embodiment of this invention, and is best understood by reference to the attached drawing.

Sulfuric acid (66 Baumé) at 70° C. is pumped through line 8 into the top of and down through tubes 3 of reactor 1. An ethylene-containing gas at 70° C. and at a pressure of 15 atmospheres is introduced at the bottom of the tubes 3 of reactor 1 through line 7 and ethylene is absorbed by the descending sulfuric acid. The resutling ethylene sulfuric ester is removed through line 11 and is pumped by pump 6 to surge tank 2. Simultaneously, ethylene sulfuric ester from surge tank 2 is pumped by means of pump 5 and line 12 to the shell side of reactor 1. Water is introduced to the ethylene sulfuric ester in line 12 by way of line 13. Unreacted gas is removed from the top of reactor 1 by way of line 10 and a partially hydrolyzed ethylene sulfuric ester mixture is removed by way of line 9 from the top of the shell of reactor 1. This material is sent to a still not shown where it is countercurrently contacted with superheated steam to complete the hydrolysis, take a mixture of steam and alcohol vapors overhead, condense the overhead to recover a dilute alcohol solution, and reconcentrate the acid as a bottoms product. The dilute alcohol is concentrated by simple distillation or can be first extracted with an aromatic hydrocarbon followed by distillation of the alcohol from the hydrocarbon. The reactor temperature is controlled by the degree of hydrolysis carried out in the shell side of the reactor. The degree of hydrolysis is controlled by means of flow regulating devices operating to proportionate the water entering line 12. Gate valve 17 is open and throttle valve 16 is set to deliver, through by-pass line 15, the required water to hold the temperature of reactor 1 at 70±5° C. A thermocouple located in reactor effluent line 9, supplies through leads 18 and 19 the required potential to activate a temperature sensitive air meter 23. This meter is adjusted so that a temperature of more than 70° in the reactor effluent in line 9 opens a valve (not shown) which allows air passing through filter 20, and line 21 to enter line 22 and increase the pressure on the diaphragm of motor valve 14.

Thereby motor valve 14 is opened and additional water enters line 12 by way of line 13. When the temperature of the reactor effluent in line 9 drops below 70° C. meter 23 operates to close the air valve and opens a vent which reduces the pressure on the diaphragm of motor valve 14 thereby partially closing valve 14, and consequently, reducing the quantity of water introduced to line 12. The thermocouple can be positioned in the shell space or elsewhere, as desired. For example, one or more thermocouples can be positioned in one or more of the tubes. Also, differential thermocouple controls can be utilized.

When producing ethanol sulfuric acid of 91 weight percent (66 Baumé) usually will be used as absorbent at temperatures of 20° to 100° C. preferably from 50° to 70° C. and pressures from 5 atmospheres to 20 atmospheres, preferably from 10 atmospheres to 15 atmospheres.

When producing propanol, the temperature usually will be reduced to 20° to 80° C. or preferably to from about 40° to 60° C. Pressure will be maintained low so that the propylene remains in the gas phase at the temperature being used. Acid strength between about 65 to 80 weight percent preferably about 75 weight percent has been found most desirable.

In producing butanols a further diminishing of temperature is usually beneficial so that 20° to 50° C. have been found operable. A preferred range is from 20° to 40° C. Pressures must be maintained near the dew point of the butylene at the temperature being utilized in order to minimize the size of equipment required.

In the above-identified Serial No. 272,141, filed by me on February 18, 1952, there is described and claimed the production of a final endothermically produced liquid chemical product, which is produced by way of an exothermically produced intermediate liquid product, which comprises forming said exothermically produced intermediate liquid product by passing the reactants from which it is formed along and in direct contact with one side of a heat exchange surface in a heat exchanger, removing intermediate product thus produced from contact with said one side of said heat exchanger, then passing the thus produced intermediate liquid product along and in direct contact with the other side of said heat exchanger surface in indirect heat exchange relationship with additional quantities of said intermediate product which is being exothermically produced, thus conducting through the said surface only heat from said exothermically produced intermediate product to the production of the final endothermically produced liquid chemical product, said heat at least in part furnishing the heat requirement of the production of said final liquid chemical product, detecting the temperature of the reaction producing said exothermically produced intermediate liquid product and varying the rate of flow of said intermediate produced product along said other side of said heat exchanger surface inversely responsive to changes of a desired temperature of said exothermically produced intermediate product on said one side of said heat exchanger surface, thereby controlling the temperature of the reaction producing said exothermically produced intermediate product as well as at least in part controlling the temperature of the reaction producing said endothermically produced final product.

Variation and modification are possible within the scope of the foregoing disclosure, the drawing and the appended claims to the invention the essence of which is that an apparatus suitable for the controlled esterification of olefins and hydrolysis of the esters formed or to accomplish other reactions, as stated, has been provided, as described, making use of a heat exchanger to utilize exothermic heat of a reaction which is conducted and controlled therein, providing all of the temperature control and coolant required for the absorption step by way of a control responsive to said temperature which controls the flow of at least the reactants on one of the sides of the heat exchanger, and the apparatus comprising in combination elements, as set forth, shown and described.

I claim:

1. An apparatus comprising in combination a substantially vertically disposed tube-bundle and shell type heat exchanger; an inlet pipe for acid at the top of said exchanger in open communication with the tubes therein; a gas outlet at the top of said exchanger in open communication with the tubes thereof; an outlet at the top of said exchanger in open communication with the shell space surrounding the tubes thereof; an inlet at the bottom of said exchanger in open communication with said tubes; an outlet at the bottom of said exchanger in open communication with said tubes; an inlet at the bottom of said exchanger in open communication with the shell space surrounding said tubes; a temperature sensing device operatively connected to said outlet in open communication with the said shell space; at least one fluid circulating means in fluid communication with said outlet at the bottom of said exchanger and said inlet at the bottom of said exchanger and in open communication with said shell space; a controlled fluid introducing means in open communication with said fluid circulating means; said temperature sensing means operatively connected to said outlet at the top of said exchanger in open communication with said shell space being also operatively connected with said controlled fluid introducing means.

2. Apparatus according to claim 1 wherein in the said fluid circulating means there is interposed a surge tank.

3. An apparatus comprising in combination a tube-bundle and shell type heat exchanger; an inlet pipe for acid at one end of said exchanger in open communication with the tubes therein; a gas outlet at said end of said exchanger in open communication with the tubes thereof; an outlet at said end of said exchanger in open communication with the shell space surrounding the tubes thereof; an inlet at the other end of said exchanger in open communication with said tubes; an outlet at said other end of said exchanger in open communication with said tubes; an inlet at said other end of said exchanger in open communication with the shell space surrounding said tubes; a temperature sensing device operatively connected to said shell space; at least one fluid circulating means in fluid communication with said outlet at said other end of said exchanger and said inlet at said other end of said exchanger and in open communication with said shell space; a controlled fluid introducing means in open communication with said fluid circulating means; said temperature sensing means operatively connected to said shell space being also operatively connected with said controlled fluid introducing means.

4. An apparatus comprising in combination a tube-bundle and shell type heat exchanger; an inlet pipe for acid at one end of said exchanger in open communication with the tubes therein; a gas outlet at said end of said exchanger in open communication with the tubes thereof; an outlet at said end of said exchanger in open communication with the shell space surrounding the tubes thereof; an inlet at the other end of said exchanger in open communication with said tubes; an outlet at said other end of said exchanger in open communication with said tubes; an inlet at said other end of said exchanger in open communication with the shell space surrounding said tubes; a temperature sensing device operatively connected to at least one of said tubes and said shell space; at least one fluid circulating means in fluid communication with said outlet at said other end of said exchanger and said inlet at said other end of said exchanger and in open communication with said shell space; a controlled fluid introducing means in open communication with said fluid circulating means; said temperature sensing means being also operatively connected with said controlled fluid introducing means.

References Cited in the file of this patent

UNITED STATES PATENTS 2,224,014    Dunham et al. _____ Dec. 3, 1940